(12) United States Patent
Fujiwaka

(10) Patent No.: US 10,554,509 B2
(45) Date of Patent: Feb. 4, 2020

(54) INFORMATION PROCESSING SYSTEM AND DELAY MEASUREMENT METHOD

(71) Applicant: NEC Corporation, Tokyo (JP)

(72) Inventor: Masaya Fujiwaka, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 261 days.

(21) Appl. No.: 15/525,083

(22) PCT Filed: Nov. 9, 2015

(86) PCT No.: PCT/JP2015/005591
§ 371 (c)(1),
(2) Date: May 8, 2017

(87) PCT Pub. No.: WO2016/075924
PCT Pub. Date: May 19, 2016

(65) Prior Publication Data
US 2018/0287899 A1    Oct. 4, 2018

(30) Foreign Application Priority Data

Nov. 10, 2014 (JP) .................................. 2014-228062

(51) Int. Cl.
*H04L 12/26* (2006.01)

(52) U.S. Cl.
CPC ........ *H04L 43/022* (2013.01); *H04L 43/0852* (2013.01); *H04L 43/16* (2013.01)

(58) Field of Classification Search
None
See application file for complete search history.

(56) References Cited

U.S. PATENT DOCUMENTS

| 2007/0147258 | A1* | 6/2007 | Mottishaw | H04L 43/12 370/241 |
| 2010/0008249 | A1* | 1/2010 | Fukuyama | H04L 12/56 370/252 |
| 2011/0307602 | A1 | 12/2011 | Kanemasa | |

FOREIGN PATENT DOCUMENTS

| JP | 2004-104273 A | 4/2004 |
| JP | 2011-258057 A | 12/2011 |

(Continued)

OTHER PUBLICATIONS

Written Opinion of the International Searching Authority of PCT/JP2015/005591 dated Jan. 19, 2016.

(Continued)

*Primary Examiner* — Jamaal Henson
(74) *Attorney, Agent, or Firm* — Sughrue Mion, PLLC

(57) ABSTRACT

The present invention provides an information processing system which more efficiently measures a delay time without limiting a traffic pattern. The information processing system includes: means for acquiring the reception sampling data of the measurement target reception traffic based on reception sampling start timing at a predetermined fixed interval and a predetermined continuous sampling period and transmission sampling data of transmission traffic of the measurement target based on predetermined transmission sampling start timing different from the reception sampling start timing and the predetermined continuous sampling period; and analysis means for calculating and outputting the delay time of the measurement target based on the reception and transmission sampling data.

10 Claims, 14 Drawing Sheets

(56) References Cited

FOREIGN PATENT DOCUMENTS

| JP | 2012-257166 A | 12/2012 |
| JP | 2013-030944 A | 2/2013 |
| JP | 2013-243534 A | 12/2013 |

OTHER PUBLICATIONS

International Search Report of PCT/JP2015/005591 dated Jan. 19, 2016.

\* cited by examiner

820 SAMPLING RULE

| CONTINUOUS SAMPLING PERIOD | 10ms |
|---|---|
| SAMPLING INTERVAL s | 100ms |
| SAMPLING PHASE SET D | {0, 10, 10, 20, 20, 20} |

830 SAMPLING DATA

| SAMPLING ID | RECEPTION SAMPLING DATA SET | TRANSMISSION SAMPLING DATA SET |
|---|---|---|

# INFORMATION PROCESSING SYSTEM AND DELAY MEASUREMENT METHOD

CROSS REFERENCE TO RELATED APPLICATIONS

This application is a National Stage of International Application No. PCT/JP2015/005591 filed Nov. 9, 2015, claiming priority based on Japanese Patent Application No. 2014-228062 filed Nov. 10, 2014, the contents of all of which are incorporated herein by reference in their entirety.

TECHNICAL FIELD

The present invention relates to a technique for measuring a delay time of a measurement target.

BACKGROUND ART

A variety of related techniques for measuring a delay time of a measurement target are known.

PTL 1 discloses a packet capture system. The packet capture system captures packets flowing on a network for a certain time and accumulates the packets. The packet capture system then analyzes the accumulated packets and analyzes a pattern of traffic. The packet capture system then captures packets based on a frequent pattern.

PTL 2 discloses a packet capture processing method. In the packet capture processing method, a certain packet capture processing device transfers a packet that can not be processed by the packet capture processing device to another packet capture processing device. Thus, each packet is captured by any one of the packet capture processing devices. In other words, PTL 2 discloses a technique of distributed processing by a plurality of packet capture processing devices.

CITATION LIST

Patent Literature

[PTL 1] Japanese Unexamined Patent Application Publication No. 2012-257166
[PTL 2] Japanese Unexamined Patent Application Publication No. 2013-030944

SUMMARY OF INVENTION

Technical Problem

In measuring a delay time, it is required to efficiently measure a delay time for traffic of any pattern.

However, since the packet capture system of PTL 1 captures packets based on frequently occurring patterns, there is a problem that it is not possible to analyze patterns with low appearance frequency. In other words, the packet capture system does not capture packets included in the traffic of patterns with low appearance frequency, and can not measure the delay time for the packets. Therefore, the packet capture system may overlook abnormal traffic and the like.

In the packet capture processing method of PTL 2, all packets are processed by any of packet capture processing devices by distributed processing. Therefore, it is possible to analyze traffic even with low appearance frequency. In other words, a delay time can be measured also for packets included in traffic of a pattern with low appearance frequency.

However, the packet capture processing method has a problem that more packet capture processing devices (server resources) are needed as the traffic increases, i.e., the efficiency is poor. In other words, in the background art described above, there is a problem that "it is impossible to efficiently measure a delay time without limiting the traffic pattern in delay time measurement".

An object of the present invention is to provide an information processing system, a delay measurement method, and a program therefor capable of solving the above-mentioned problems.

Solution to Problem

An information processing system according to one aspect of the present invention includes traffic capture means for acquiring reception sampling data based on a sampling interval indicating a fixed interval of reception sampling start timing of a fixed interval which is timing to start reception sampling that acquires reception sampling data by capturing reception traffic of a measurement target and a continuous sampling period indicating a continuing time, and for acquiring the transmission sampling data based on transmission sampling start timing indicating timing to start transmission sampling for acquiring transmission sampling data by capturing transmission traffic of the measurement target which is different from the reception sampling start timing, and the continuous sampling period, and analysis means for calculating a delay time of the measurement target based on the reception sampling data and the transmission sampling data and outputting the calculated delay time.

In a delay measurement method according to one aspect of the present invention, a computer acquires reception sampling data based on a sampling interval indicating a fixed interval of reception sampling start timing of a fixed interval which is timing to start reception sampling that acquires reception sampling data by capturing reception traffic of a measurement target and a continuous sampling period indicating a continuing time, acquires the transmission sampling data based on transmission sampling start timing indicating timing to start transmission sampling for acquiring transmission sampling data by capturing transmission traffic of the measurement target which is different from the reception sampling start timing, and the continuous sampling period, calculates a delay time of the measurement target based on the reception sampling data and the transmission sampling data, and outputs the calculated delay time.

A computer-readable non-transitory recording medium according to one aspect of the present invention stores a program for causing a computer to execute a process of acquiring reception sampling data based on a sampling interval indicating a fixed interval of reception sampling start timing of a fixed interval which is timing to start reception sampling that acquires reception sampling data by capturing reception traffic of a measurement target and a continuous sampling period indicating a continuing time, a process of acquiring the transmission sampling data based on transmission sampling start timing indicating timing to start transmission sampling for acquiring transmission sampling traffic of the measurement target which is different from the reception sampling start timing, and the continuous sampling period, a process of calculating a delay time of the measurement target based on the reception sampling data and the transmission sampling data, and a process of outputting the calculated delay time.

Advantageous Effects of Invention

The present invention has an effect that, in delay time measurement, a delay time can be more efficiently measured without limiting a traffic pattern.

DESCRIPTION OF EMBODIMENTS

Figure 1:
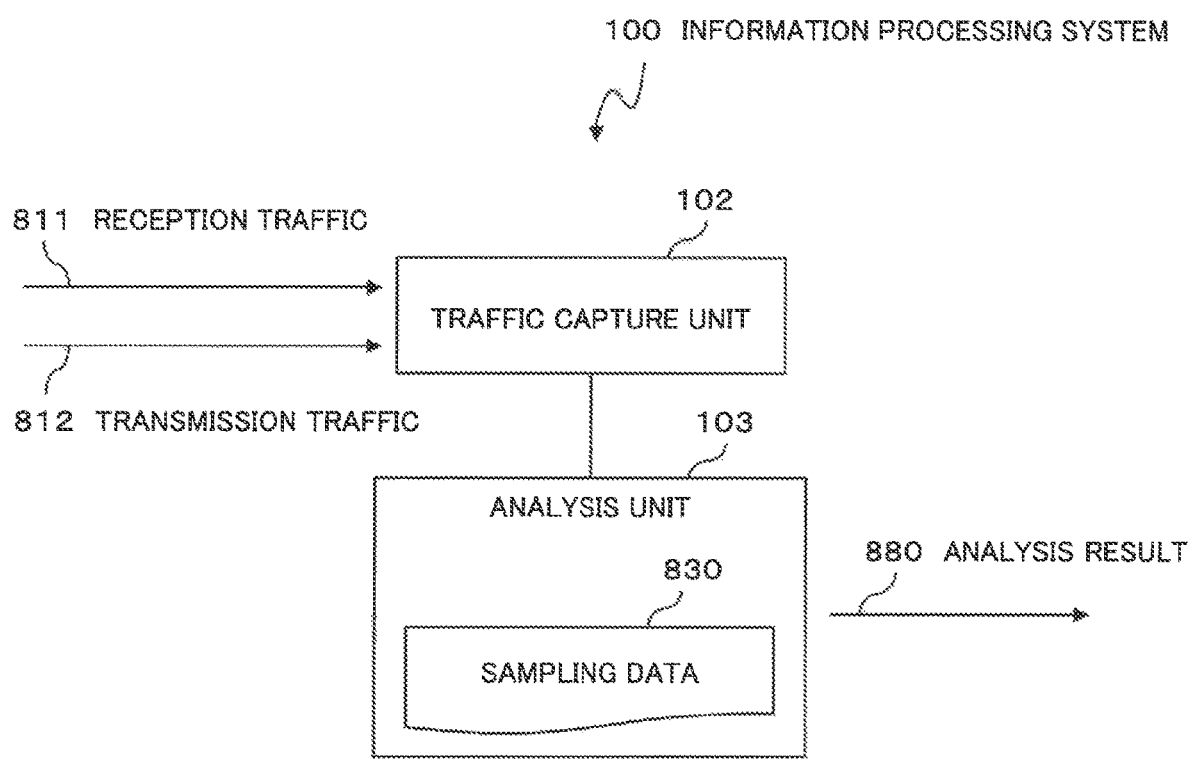
FIG. 1 is a block diagram illustrating a configuration of an information processing system according to a first example embodiment of the present invention.

Next, example embodiments for carrying out the present invention will be described in detail with reference to the drawings. In each of the drawings and the embodiments described in the specification, the same reference numerals are assigned to the same components, and the explanation is appropriately omitted. The directions of the arrows in the drawings are merely examples, and do not limit the direction of a signal between blocks.

First Example Embodiment

FIG. 1 is a block diagram illustrating a configuration of an information processing system 100 according to the first example embodiment of the present invention. As illustrated in FIG. 1, the information processing system 100 according to the present example embodiment includes a traffic capture unit 102 and an analysis unit 103.

Each component illustrated in FIG. 1 may be a circuit of a hardware unit, a module included in a microchip, or a component divided into functional units of a computer apparatus. In other words, each of the components illustrated in FIG. 1 may be achieved by a circuit. The circuit may be a circuit of a hardware unit, a module included in a microchip, or a computer. For example, the circuit may be an LSI (Large Scale Integration) or a PGA (Programmable Gate Array), and the LSI and the PGA may be configured as a single chip or multiple chips. Further, the circuit may be a server, or a combination of a server and a local device. Here, it is assumed that the components illustrated in FIG. 1 are components divided into functional units of a computer apparatus. The information processing system 100 illustrated in FIG. 1 may be implemented in a certain server, or may be usable in such a way that components illustrated in FIG. 1 are distributed and installed on a network.

Figure 2:
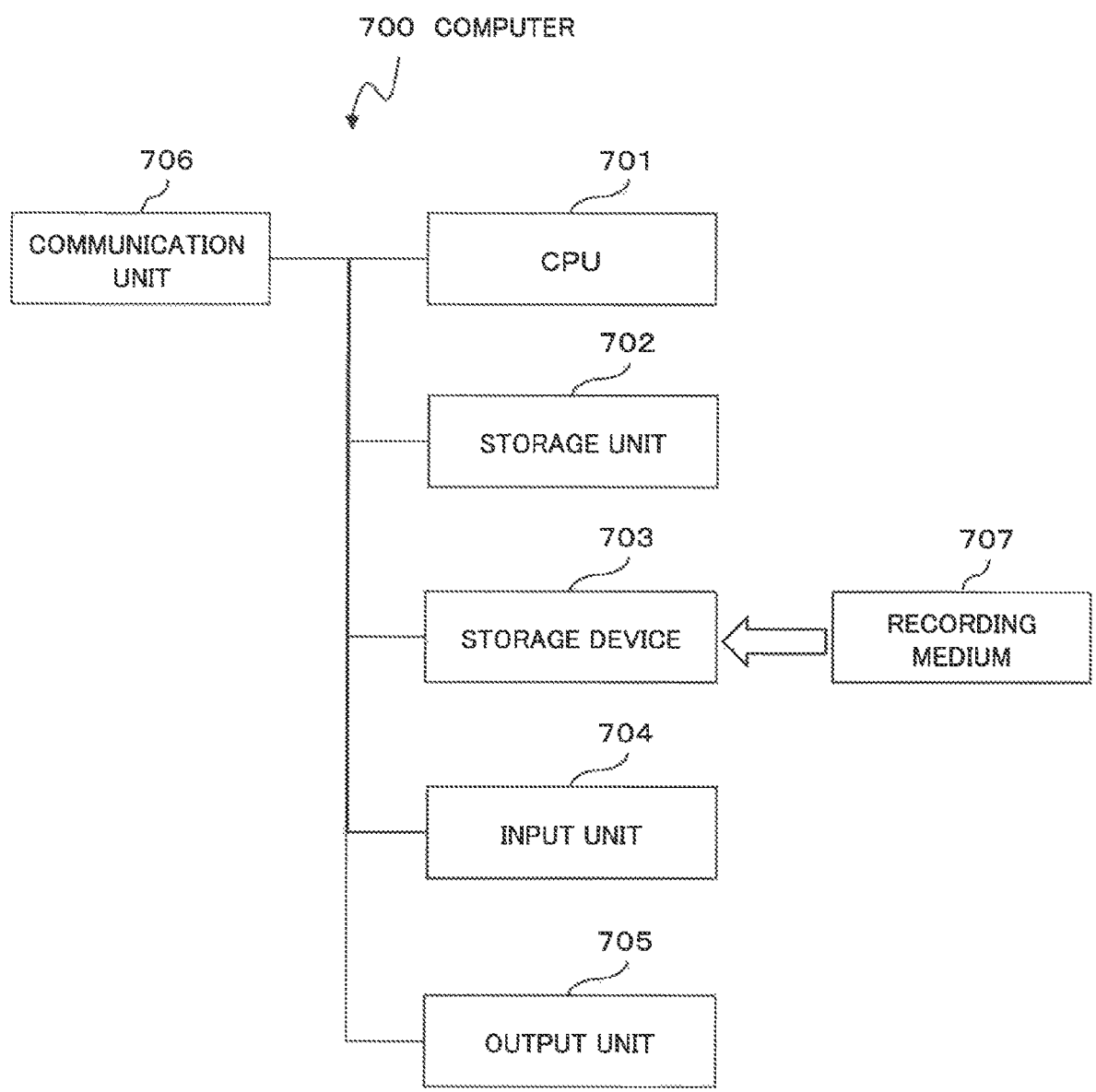
FIG. 2 is a block diagram illustrating a hardware configuration of a computer that implements an information processing system according to the first example embodiment.

FIG. 2 is a diagram illustrating a hardware configuration of a computer 700 that realizes the information processing system 100 according to the present example embodiment.

As illustrated in FIG. 2, the computer 700 includes a CPU (Central Processing Unit) 701, a storage unit 702, a storage device 703, an input unit 704, an output unit 705, and a communication unit 706. Further, the computer 700 includes a recording medium (or storage medium) 707 supplied from the outside. For example, the recording medium 707 is a nonvolatile recording medium (non-transitory recording medium) that non-transitory stores information. The recording medium 707 may be a transitory recording medium that holds information as a signal.

The CPU 701 operates an operating system (not illustrated) and controls an overall operation of the computer 700. For example, the CPU 701 reads its program and data from the recording medium 707 attached to the storage device 703, and writes the read program and the data in the storage unit 702. Here, the program is, for example, a program for causing the computer 700 to execute operations of flowcharts illustrated in FIGS. 13 and 14 described below.

Then, the CPU 701 executes various processes as the traffic capture unit 102 and the analysis unit 103 illustrated in FIG. 1 according to the read program and based on the read data.

The CPU 701 may download the program and the data from the external computer (not illustrated) connected to a communication network (not illustrated) to the storage unit 702.

The storage unit 702 stores the program and the data. The storage unit 702 may store a sampling rule 820, sampling data 830, and the like which will be described below. The storage unit 702 may be included as a part of the traffic capture unit 102 and the analysis unit 103.

The storage device 703 stores the program on the recording medium 707 in a computer-readable manner. The recording medium 707 includes, for example, an optical disk, a flexible disk, a magnetic optical disk, an external hard disk a semiconductor memory, and the like. The storage device 703 may store the data. The storage device 703 may store the sampling rule 820, sampling data 830, and others which will be described below. The storage device 703 may be included as a part of the traffic capture unit 102, and the analysis unit 103.

The input unit 704 receives an input of an operation by an operator and an input of information from the outside. Devices used for the input operation are, for example, a mouse, a keyboard, a built-in key button, a touch panel, and other devices. The input unit 704 may be included as a part of the traffic capture unit 102 and the analysis unit 103.

The output unit 705 is achieved by, for example, a display. The output unit 705 is used for an input request to an operator by, for example, a GUI (GRAPHICAL User Interface), an output presentation to an operator, and the like. The output unit 705 may be included as a part of the traffic capture unit 102 and the analysis unit 103.

The communication unit 706 achieves an interface with a measurement target 101 which will be described below. The communication unit 706 achieves an interface with any external device. The communication unit 706 may be included as a part of the traffic capturing unit 102 and the analysis unit 103.

As described above, each component of the functional unit of the information processing system 100 illustrated in FIG. 1 is realized by the computer 700 including the hardware configuration illustrated in FIG. 2. However, means for achieving each part of the computer 700 is not limited to the above. In other words, the computer 700 may be achieved by one physically connected device, or may be achieved by a plurality of devices which are two or more physically separated devices connected wired or wirelessly.

When the recording medium 707 storing a code of the above-described program is supplied to the computer 700, the CPU 701 may read and execute the code of the program stored in the recording medium 707. Alternatively, the CPU 701 may store the code of the program stored in the recording medium 707 in the storage unit 702, the storage device 703, or both of them. In other words, the present example embodiment includes an example embodiment of the recording medium 707 that transitorily or non-transitorily stores the program (software) executed by the computer 700 (CPU 701). A storage medium that non-transitorily stores information is also called a nonvolatile storage medium.

The above is a description of each component of the hardware unit of the computer 700 that achieves the information processing system 100 according to the present example embodiment.

Figure 3:
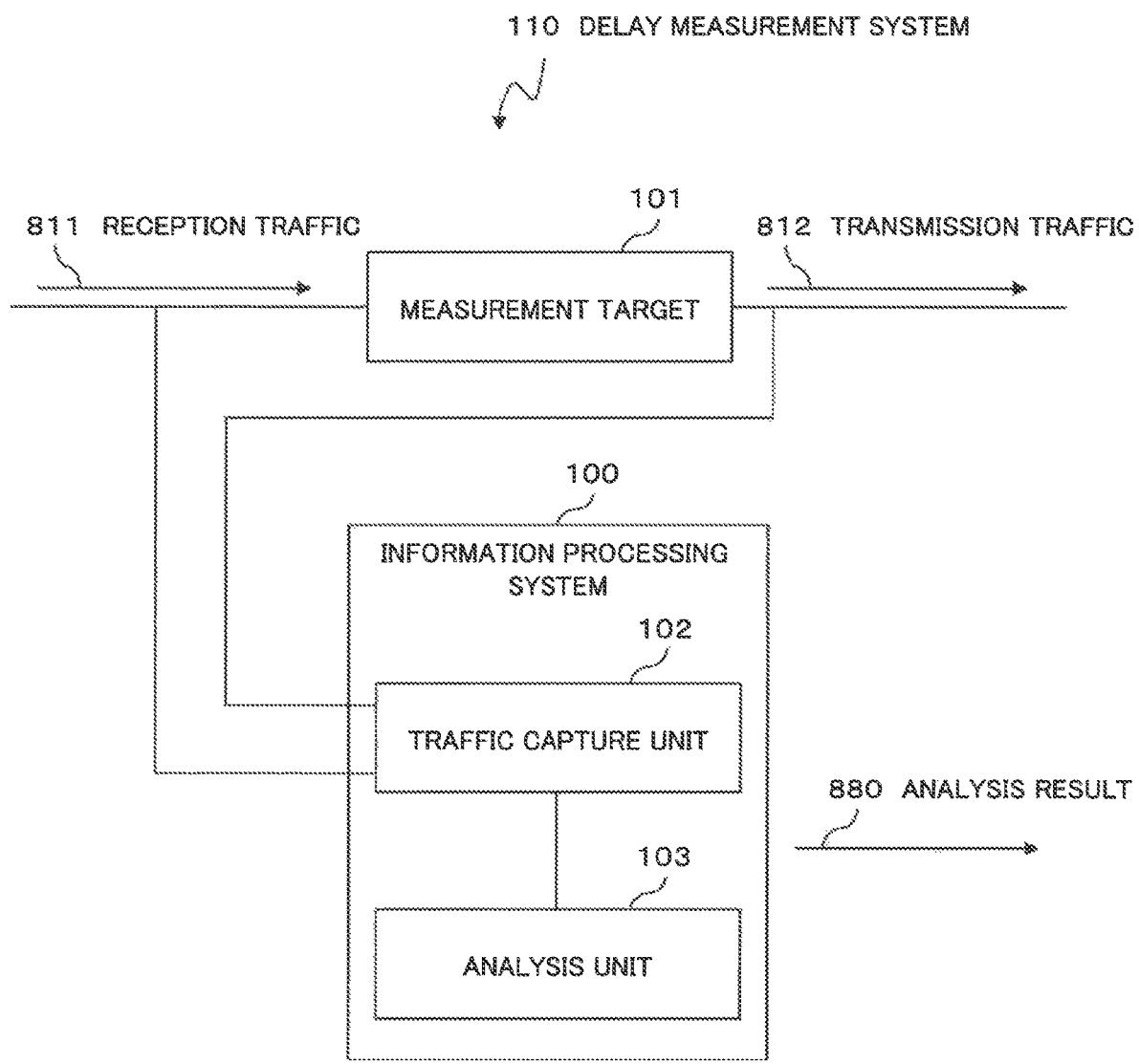
FIG. 3 is a block diagram illustrating a configuration of a delay measurement system including an information processing system according to the first example embodiment.

FIG. 3 is a block diagram illustrating a configuration of the delay measurement system 110 including the information processing system 100. As illustrated in FIG. 3, the delay measurement system 110 includes the measurement target 101 and the information processing system 100.

The measurement target 101 may be a device or a group of devices that transmit and receive traffic, and examples thereof include a physical server, a virtual server, and a switch device.

The information processing system 100 captures reception traffic 811 and transmission traffic 812 of the measurement target 101. Hereinafter, the reception traffic 811 and the transmission traffic 812 are collectively referred to simply as "traffic".

Returning to FIG. 1, each component of a functional unit of the information processing system 100 will be described.

===Traffic Capture Unit 102===

The traffic capture unit 102 acquires reception sampling data based on reception sampling start timing and a continuous sampling period. The reception sampling start timing indicates timing of starting reception sampling that captures the reception traffic 811 of the measurement target 101 and acquires the reception sampling data. The reception sampling start timing may be timing of a desired fixed interval (hereinafter referred to as a sampling interval s). The continuous sampling period (hereinafter referred to as a continuous sampling period t) indicates a time period during which the reception sampling continues.

Then, the traffic capture unit 102 acquires transmission sampling data based on the transmission sampling start timing and the continuous sampling period t. The transmission sampling start timing indicates timing of starting a transmission sampling to capture the transmission traffic 812 of the measurement target 101 and obtain the transmission sampling data. The timing indicated by the transmission sampling start timing is timing shifted from timing indicated by the above reception start timing by a desired fixed period (hereinafter referred to as a sampling phase d). The continuous sampling period t further indicates a time period during which the transmission sampling continues.

As described above, a sampling rule of the reception traffic 811 is different from a sampling rule of the transmission traffic 812. Specifically, the sampling rule of the reception traffic 811 is defined by the continuous sampling period t and the sampling interval s. The sampling rule of the transmission traffic 812 is defined by the continuous sampling period t and a sampling phase set D={d1, d2, . . . , dk} which is a set of sampling phases d.

Figure 4:
FIG. 4 is a diagram illustrating an example of a sampling rule according to the first example embodiment.

FIG. 4 is a diagram illustrating an example of the sampling rule 820. In the sampling rule 820 illustrated in FIG. 4, the continuous sampling period t is "10 milliseconds (hereinafter, milliseconds are described as ms)", the sampling interval s is "100 ms", and the sampling phase set D is "{0, 10, 10, 20, 20, 20}".

The continuous sampling period t refers to a period during which reception sampling and transmission sampling are started and each of the reception traffic 811 and the transmitted traffic 812 are captured in succession. Hereinafter, reception sampling and transmission sampling are referred to as reception/transmission sampling. In other words, when the continuous sampling period t elapses after the traffic capture unit 102 starts capturing the reception traffic 811, the traffic capture unit 102 stops capturing the reception traffic 811.

A next time at which the traffic capture unit 102 starts reception sampling, namely, next reception sampling start timing, is a time obtained by adding a sampling interval s to a time at which the previous reception sampling is started.

A time at which the traffic capture unit 102 starts transmission sampling, namely, transmission sampling start timing, is a time which is shifted by a sampling phase d from reception sampling start timing. When the continuous sampling period t elapses after the traffic capture unit 102 starts capturing the transmission traffic 812, the traffic capture unit 102 stops capturing the transmission traffic 812.

The traffic capture unit 102 assigns a sampling ID (Identifier) to each of a set of reception sampling data and a set of transmission sampling data captured during the continuous sampling period t. The sampling IDs may be, for example, sequentially increasing positive integers, respectively. The same sampling ID is assigned to a certain reception sampling data set and its corresponding transmission sampling data set. For example, when start times of a reception sampling and a transmission sampling coincide, the continuous sampling period t is set to 100 ms, the sampling interval s is set to 1000 ms, an initial time is set to 0, and the sampling phase set D is set to {0}. In this case, the same sampling ID is assigned to the reception sampling data set and the transmission sampling data set at the time of 0 to 100 ms. Then, the same sampling ID is assigned to the reception sampling data set and the transmission sampling data set at the time of 1000 to 1100 ms.

For the sake of explanation of the sampling ID, the sampling start times of the reception traffic 811 and the transmission traffic 812 are assumed to be the same here, however, in the present example embodiment, by delaying the sampling start time, a low load and efficient delay measurement is achieved. The deviation of the start time is defined as the aforementioned sampling phase set D={$d_1$, $d_2$, . . . , $D_k$}. Since the sampling phase set D is defined as a set of sampling phases d, a plurality of shifting methods of the sampling start time can be set. The sampling phase d is a value indicating how much the transmission sampling start time is shifted from the reception sampling start time.

When a plurality of sampling phases d are defined, a sampling phase d of dm (m=(i mod k)+1) is applied to the transmission traffic 812 of the i-th sampling ID. For example, at t=100 ms, s=1000 ms, and k=2, the sampling phase is set to {0, 100}. In this case, for the transmission traffic of the first sampling ID, the sampling phase is 0 ms. Similarly, the sampling phase is 100 ms for the transmission traffic of the second sampling ID, 0 ms for the transmission traffic of the third sampling ID, . . . and so on.

In this case, when the initial time is set to 0, the reception sampling is performed at the time of 0 to 100 ms at which the sampling ID "0" is first assigned to the reception sampling data set. Here, the format "xxx "y"" indicates "y" which is the value of "xxx". That is, "Sampling ID "0"" indicates "the value of sampling ID "0"". Next, the reception sampling is performed at the time of 1000 to 1100 ms, at which the sampling ID "1" is assigned to the reception sampling data set. Next, the reception sampling is performed at the time of 2000 to 2100 ms at which the sampling ID "2" is assigned to the reception sampling data set. Next, the reception sampling is performed at the time of 3000 to 3100 ms at which the sampling ID "3" is assigned to the reception sampling data set. Thereafter, the traffic capture unit 102 continues the reception sampling similarly.

On the other hand, the start time of the transmission sampling is shifted from 0, 100, 0, 100, . . . with respect to the sampling start time of the reception traffic 811. That is, the traffic capture unit 102 determines the transmission sampling start timing for each of the plurality of sampling phases d in order and repeatedly. For this reason, the transmission sampling is first performed at the time of 0 to 100 ms at which the sampling ID "0" is assigned to the transmission sampling data set. Next, the transmission sampling is performed at the time of 1100 to 1200 ms at which the sampling ID "1" is assigned to the transmission sampling data set. Next, the transmission sampling is performed at the time of 2000 to 2100 ms at which the sampling ID "2" is assigned to the transmission sampling data set. Next, the transmission sampling is performed at the time of 3100 to 3200 ms, in which the sampling ID "3" is assigned to the transmission sampling data set. Thereafter, the traffic capture unit 102 continues the transmission sampling similarly.

===Analysis Unit 103===

The analysis unit 103 calculates and outputs a delay time of the measurement target 101 based on the reception sampling data set and the transmission sampling data set.

For example, the analysis unit 103 calculates a delay time of each packet by matching the packet data included in each of the reception sampling data set and the transmission sampling data set.

Figure 5:
FIG. 5 is a diagram illustrating an example of a structure of sampling data in the first example embodiment.

FIG. 5 is a diagram illustrating one example of the structure of sampling data 830. As illustrated in FIG. 5, the sampling data 830 includes a sampling ID, a reception sampling data set, and a transmission sampling data set. In other words, the sampling data 830 includes a pair of received sampling data set and transmission sampling data set, each assigned the same sampling ID.

The analyzing unit 103 holds the sampling data 830 with a structure illustrated in FIG. 5 in the number equal to or smaller than a predetermined value in the storage unit 702 illustrated in FIG. 2, for example, and calculates a delay time of the measurement target 101 based on the sampling data 830 which is being held.

The above is a description of each component of a functional unit of the information processing system 100.

Next, the relation between a reception/transmission sampling and a delay measurement will be described.

First, cases in which the reception sampling start timing and the transmission sampling start timing are the same, in other words, cases in which the sampling phase d is always "0", will be described.

Figure 6:
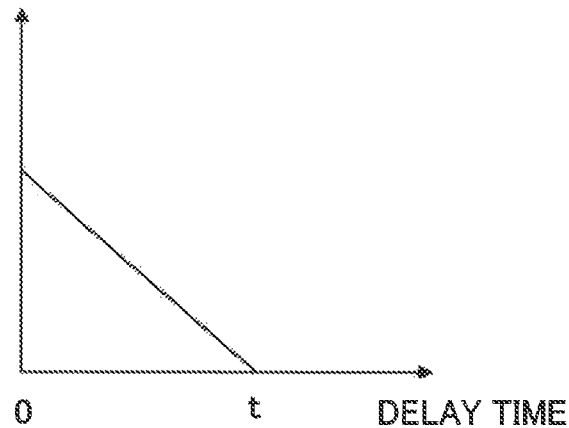
FIG. 6 is a diagram illustrating an example of a delay evaluation distribution in the first example embodiment.

In this case, when the reception sampling start timing is t0, for example, the sampling data 830 with the same sampling ID is the sampling data 830 in the period from t0 to t0+continuous sampling period t. Assuming that the traffic transmitted and received for this continuous sampling period t is uniform with respect to the sampling data 830, the delay evaluation distribution is as illustrated in FIG. 6. FIG. 6 is a diagram illustrating a delay evaluation distribution when the continuous sampling period t is "t" and the sampling phase d is "0".

Here, the delay evaluation distribution is a distribution representing which delay time can be evaluated to what degree by the sampling data 830. The delay evaluation value is the probability that the delay of the packet included in the reception sampling data set can be calculated. Intuitively, it may be considered that the delay evaluation value corresponds to the number of times that packets of a certain delay time included in the reception sampling data set can be collected. For example, when the sampling phase d is "0", since there can be no packet whose delay is larger than the continuous sampling period t in the sampling data 830, the delay evaluation value becomes "0" after the continuous sampling period t.

Figure 7:
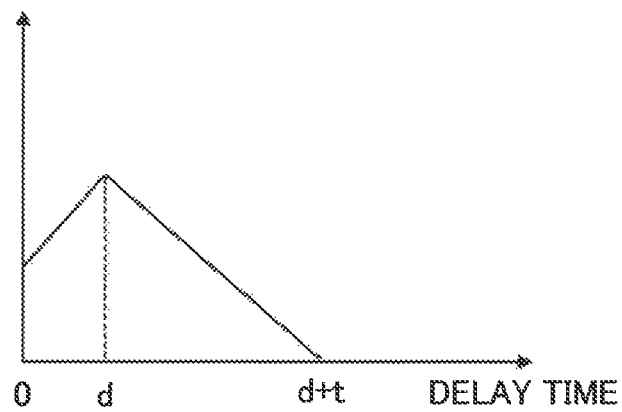
FIG. 7 is a diagram illustrating an example of a delay evaluation distribution in the first example embodiment.
Figure 8:
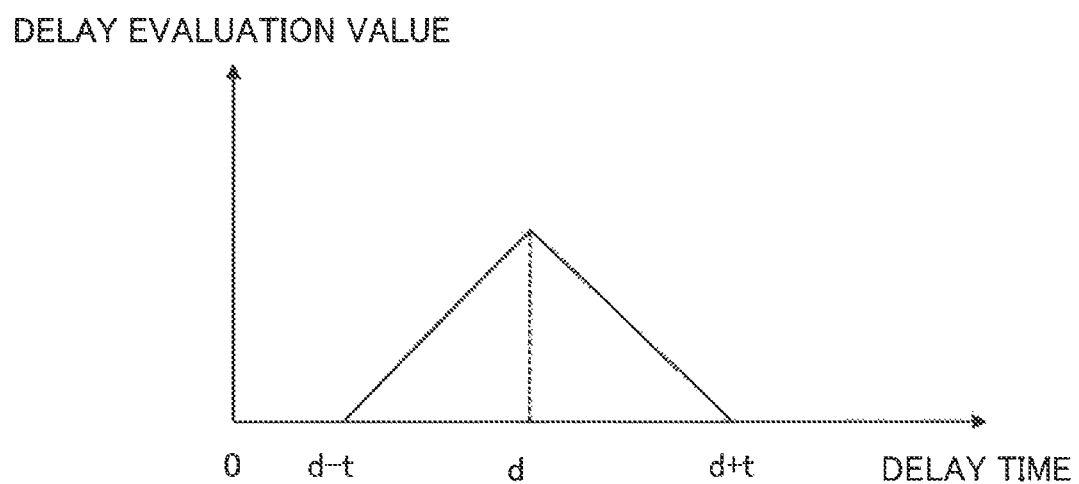
FIG. 8 is a diagram illustrating an example of a delay evaluation distribution in the first example embodiment.

FIG. 7 is a diagram illustrating a delay evaluation distribution in the case of sampling phase d "d"<continuous sampling period t "t". FIG. 8 is a diagram illustrating a delay evaluation distribution in the case of sampling phase d "d">=continuous sampling period t "t". As illustrated in FIG. 7 or FIG. 8, the evaluation value becomes the highest when the delay time is the same as the sampling phase d. When the sampling phase d is "d", the delay that can be evaluated using one sampling data 830 is at most "d+t".

The analysis unit 103 can also perform evaluation for a case that the delay is larger than "d+t", by using a plurality of sampling data 830 with different sampling IDs. The plurality of sampling data 830 with different sampling IDs are, for example, a reception sampling data set with a sampling ID of "0" and a transmission sampling data set with a sampling ID of "1".

Figure 9:
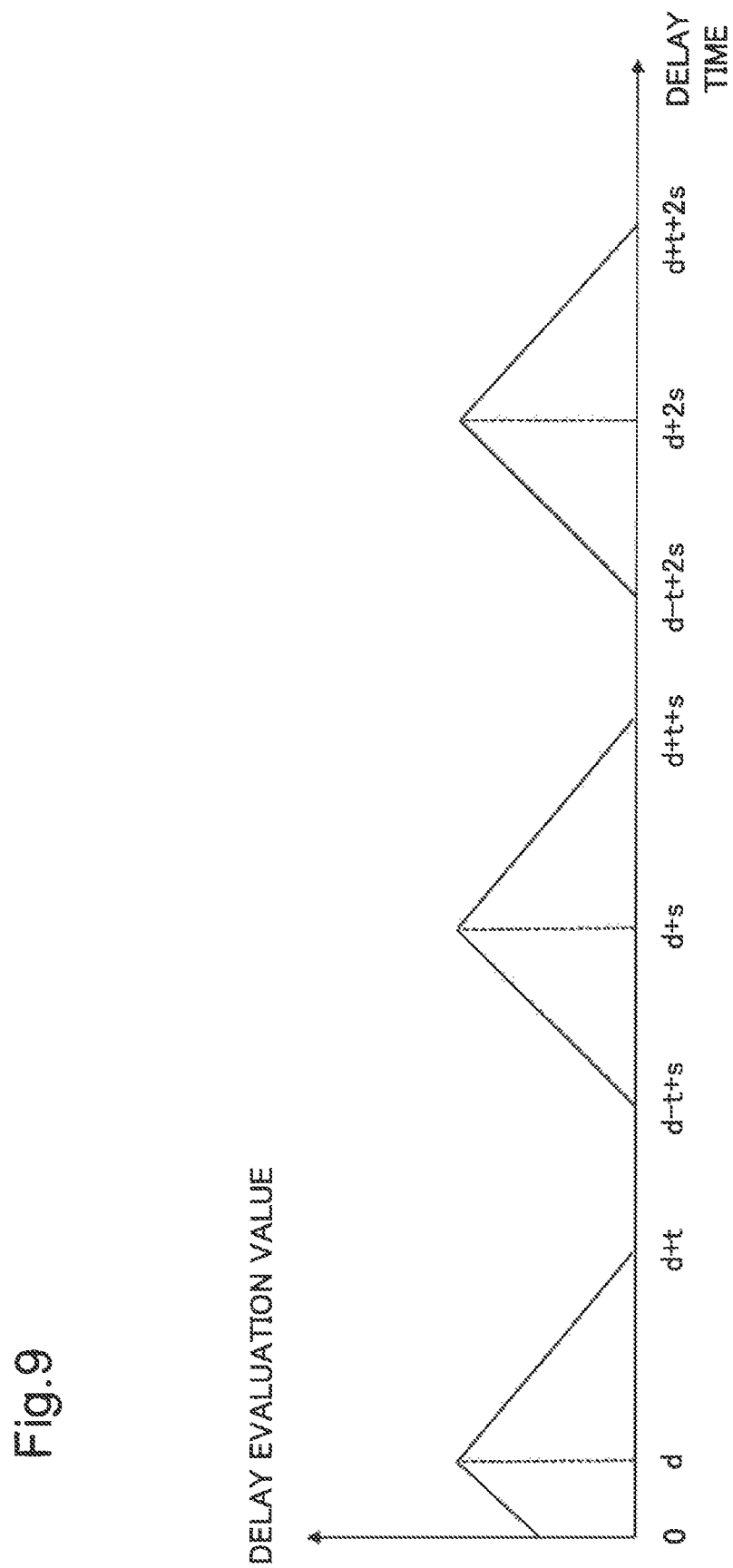
FIG. 9 is a diagram illustrating an example of a delay evaluation distribution based on sampling data of different sampling IDs in the first example embodiment.

However, here, the sampling data 830 with different sampling IDs is not used for evaluation of delay measurement. For example, FIG. 9 is a diagram illustrating an example of the delay evaluation distribution based on the sampling data 830 with different sampling IDs. In the case of the delay evaluation distribution as illustrated in FIG. 9, as the sampling interval s increases, a possibility of evaluating an excessively large delay which does not actually exist may increase. In order to hold a plurality of sampling data 830, the analysis unit 103 requires a larger memory amount. Therefore, in the following description, it is assumed that the delay measurement using the sampling data 830 of different sampling IDs is not evaluated.

However, when the memory amount mounted on the analyzing unit 103 is high, the number of sampling data 830 corresponding to the memory loading amount may be used by an appropriate sampling interval s which is derived empirically or theoretically in advance.

In the information processing system 100 according to the present example embodiment, any delay evaluation distribution can be constructed by appropriately setting the sampling phase set D. For example, when intensively sampling packets of low frequency (for example, 30 ms) is needed, it become possible by including more sampling phases d '30' in the sampling phase set D. In other words, when constructing a desired probability distribution with respect to the delay time by the appropriately set sampling phase set D, it is possible to efficiently achieve the construction of the probability distribution. This is because the problem that it takes time to collect data with low frequency packets (for example, with high delay) in random sampling, when constructing a desired probability distribution, is solved by setting the sampling phase set D appropriately.

The sampling phase set D may be determined in advance or may be dynamically changed during operation of the information processing system 100. For example, in cases in which it is unknown how much high delay with low frequency is, the information processing system 100 is operated with a uniform sampling phase d for a fixed time to obtain an analysis result 880. Next, the sampling phase set D may be appropriately reset based on the analysis result 880.

As described above, the information processing system 100 can more efficiently measure a delay time without limiting to specific traffic. Below, an example will be described by using specific values.

For example, it is assumed that the delay time of the measurement target 101 is mostly 10 ms or less, and is at most about 20 ms. Then, an accurate probability distribution for such delay time is desired to be constructed.

It is assumed that the sampling rule 820 illustrated in FIG. 4 is set. Specifically, the traffic capture unit 102 captures the reception traffic 811 of the measurement target 101 based on the continuous sampling period t "10 ms" and the sampling interval "100 ms", and transmits the reception sampling data to the analysis unit 103. The traffic capture unit 102 captures the transmission traffic 812 of the measurement target 101 based on the continuous sampling period t "10 ms", a sampling phase set D={0, 10, 10, 20, 20, 20}, and transmits the transmission sampling data to the analysis unit 103.

As described above, the continuous sampling period t is "10 ms" for the sampling interval "100 ms". For this reason, assuming that the reception traffic 811 and the transmitted traffic 812 are uniform over time, one tenth of the total traffic will be captured.

Note that cases in which the load of the traffic capture unit 102 or the analysis unit 103 is too high can be dealt with by setting the continuous sampling period t short or the sampling interval s long.

Figure 10:
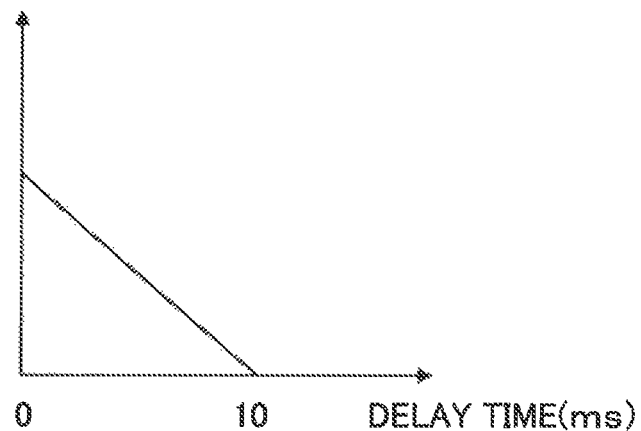
FIG. 10 is a diagram illustrating an example of a delay evaluation distribution in the first example embodiment.

When the initial time is assumed to be 0, in the first reception/transmission sampling (the sampling ID is "1"), the traffic capture unit 102 captures the reception traffic 811 when the time is "0 to 10 ms". Under the same condition, the traffic capture unit 102 captures the transmission traffic 812 when the time is "0 to 10 ms". FIG. 10 is a diagram illustrating a delay evaluation distribution of the first reception/transmission sampling.

Figure 11:
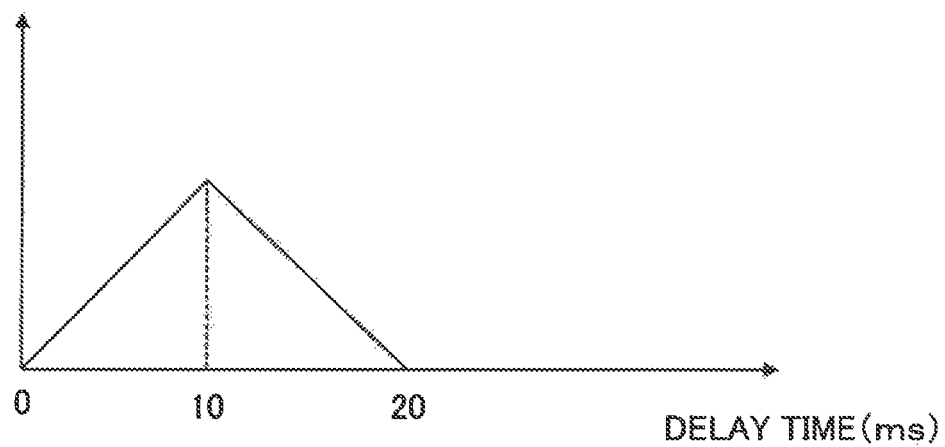
FIG. 11 is a diagram illustrating an example of a delay evaluation distribution in the first example embodiment.

In the reception/transmission sampling with the sampling ID "2", the traffic capture unit 102 captures the reception traffic 811 when the time is "100 to 110 ms" and the transmission traffic 812 when the time is "110 to 120 ms". FIG. 11 is a diagram illustrating a delay evaluation distribution when the sampling ID is "2".

Figure 12:
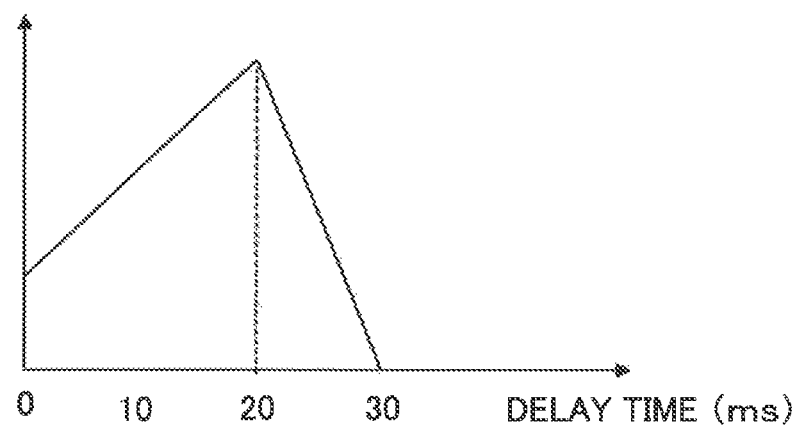
FIG. 12 is a diagram illustrating an example in which delay evaluation distributions of six sampling phase times in the first example embodiment are added up.

When the reception/transmission sampling with the sampling ID "6" is completed, the traffic capture unit 102 makes a round of the sampling phase set D. FIG. 12 is a diagram illustrating the addition of six delay evaluation distributions by the reception/transmission sampling with respect to the sampling ID "1" to "6". FIG. 12 illustrates that delay evaluation can be intensively performed centered on "20 ms".

Since the sampling phase d is included in the sampling phase set D={0, 10, 10, 20, 20, 20} and the six sampling phases d are repeated, the delay evaluation distribution as a whole of continuous reception/transmission sampling also becomes equivalent to FIG. 12.

Next, the operation of the present example embodiment will be described in detail with reference to the drawings.

Figure 13:
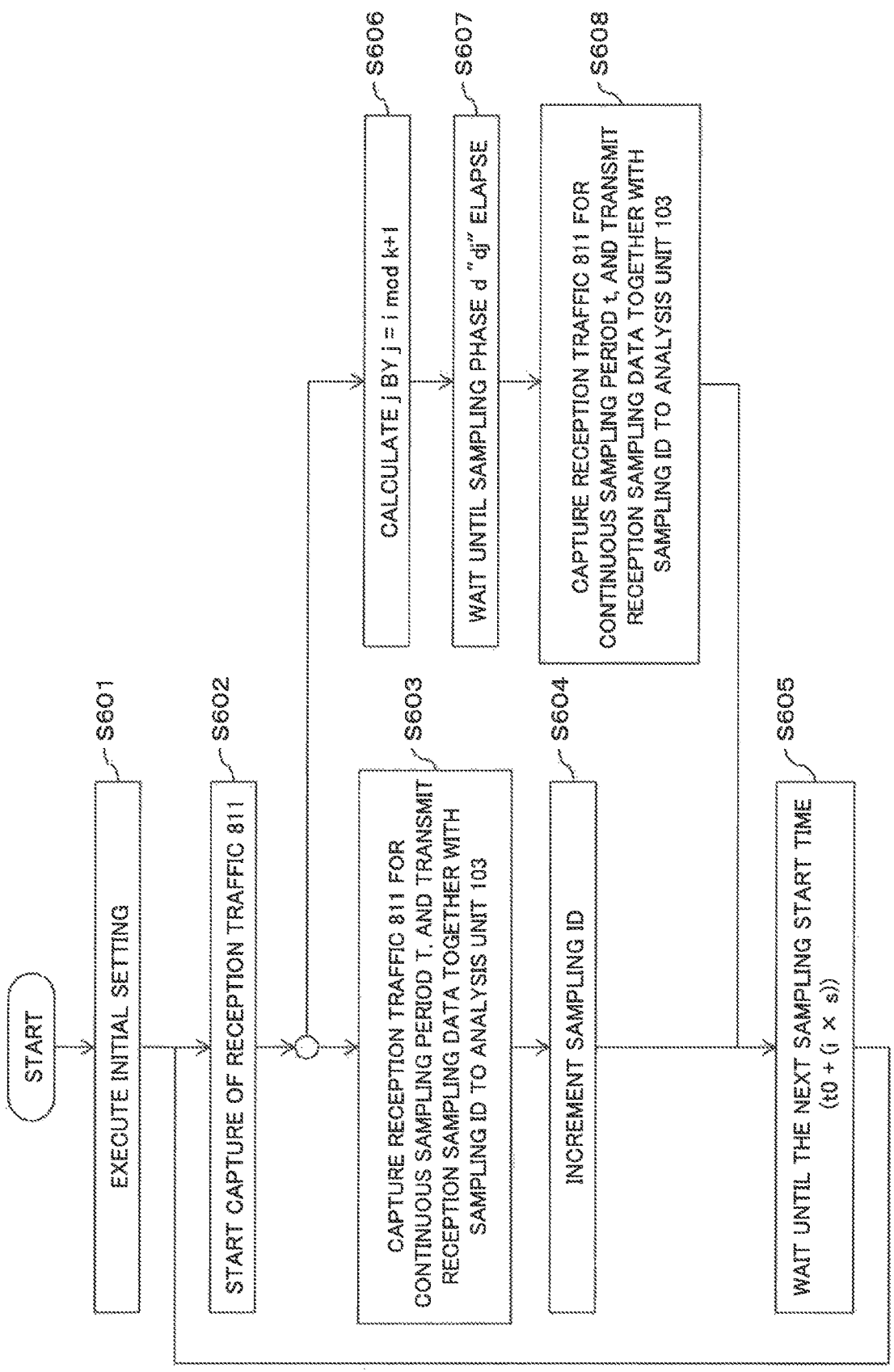
FIG. 13 is a flowchart illustrating an operation of a traffic capture unit according to the first example embodiment.
Figure 14:
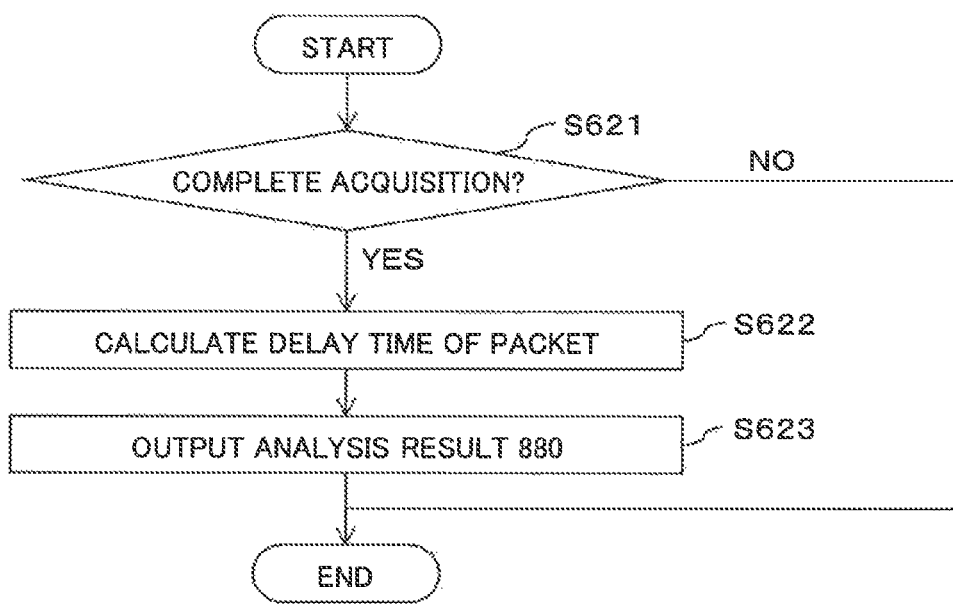
FIG. 14 is a flowchart illustrating an operation of an analysis unit in the first example embodiment.

FIG. 13 and FIG. 14 are flowcharts illustrating the operation of the information processing system 100 according to the present embodiment. The process according to this flowchart may be executed based on a program control by the CPU 701 described above. The step name of the process is indicated by a symbol as illustrated in S601.

The traffic capture unit 102 starts the operation of the flowchart illustrated in FIG. 13 upon receiving an instruction from an operator via the input unit 704 illustrated in FIG. 2 as a trigger. The traffic capture unit 102 may start the operation of the flowchart illustrated in FIG. 13 upon receiving a request from the outside via the communication unit 706 illustrated in FIG. 2 as a trigger. The traffic capture unit 102 may start the operation of the flowchart illustrated in FIG. 13 at a predetermined time.

In FIG. 13, the traffic capture unit 102 executes initial setting (step S601). Specifically, the traffic capture unit 102 sets i (variable indicating sampling ID)=0 and initial start time to "t0". Further, the traffic capture unit 102 acquires the sampling rule 820 to obtain a continuous sampling period t, a sampling period s, and a sampling phase set D={d1, d2, . . . , Dk}.

For example, the sampling rule 820 may be stored in the storage unit 702 or the storage device 703 illustrated in FIG. 2 in advance. The traffic capture unit 102 may acquire the sampling rule 820 input by the operator via the input unit 704 illustrated in FIG. 2. The traffic capture unit 102 may receive the sampling rule 820 from a device which is not illustrated via the communication unit 706 illustrated in FIG. 2. The traffic capture unit 102 may acquire the sampling rule 820 recorded on the recording medium 707 via the storage device 703 illustrated in FIG. 2.

Next, the traffic capture unit 102 starts capturing of the reception traffic 811 (step S602).

Next, the traffic capture unit 102 captures the reception traffic 811 for the continuous sampling period t and transmits the acquired reception sampling data together with the sampling ID to the analysis unit 103 (step S603). Each time the traffic capture unit 102 captures the reception traffic 811, the traffic capture unit 102 may transmit the reception sampling data to the analysis unit 103. The traffic capture unit 102 may transmit the reception sampling data of a certain amount (for example, all of the continuous sampling period t) batchwise to the analysis unit 103.

Next, the traffic capture unit 102 increments the sampling ID (step S604).

Next, the traffic capture unit 102 waits until the next sampling start time (t0+(i×s)) (step S605). Here, "s" is the time of sampling period s. When the next sampling start time comes, the process returns to step S602.

In concurrence with the operation of step S603, the traffic capture unit 102 calculates "j" from "j=(i mod k)+1" (step S606).

Next, the traffic capture unit 102 waits until the sampling phase d "dj" elapses (step S607).

Next, the traffic capture unit 102 captures the transmission traffic 812 for the continuous sampling period t and transmits the acquired transmission sampling data together with the sampling ID to the analysis unit 103 (step S608).

The analysis unit 103 starts the operation illustrated in FIG. 14 each time the transmission sampling data is received from the traffic capture unit 102.

The analysis unit 103 determines whether acquisition of the pair of the reception sampling data set and the transmission sampling data set which corresponds to the same sampling ID, is completed (step S621). When the acquisition is completed (YES in step S621), the process proceeds to step S622. When the process has not been completed (NO in step S621), the process is terminated.

Next, the analysis unit 103 performs matching between the reception sampling data set and the transmission sampling data set, and calculates the delay time of each packet (step S622).

Next, the analysis unit 103 outputs the analysis result 880 based on the calculated delay time (step S623). After that, the process is terminated.

For example, the analysis unit 103 outputs the analysis result 880 via the output unit 705 illustrated in FIG. 2. In addition, the analysis unit 103 may transmit the analysis result 880 to a device (not illustrated) via the communication unit 706 illustrated in FIG. 2. The analysis unit 103 may record the analysis result 880 in the recording medium 707 via the storage device 703 illustrated in FIG. 2.

The first advantageous effect of the present example embodiment described above is that the delay time can be more efficiently measured without limiting the traffic pattern.

Specifically, the first advantageous effect is that delay measurement of packets with low occurrence frequency can be performed without holding all traffic in memory, storage, or the like.

The reason is because it includes the following configuration. Specifically, first, the traffic capture unit 102 acquires reception sampling data based on the reception sampling start timing and the continuous sampling period t. Second, the traffic capture unit 102 acquires the transmission sampling data based on the transmission sampling start timing different from the reception sampling start timing and the continuous sampling period t. Third, the analysis unit 103 calculates and outputs the delay time of the measurement target 101 based on the reception sampling data and the transmission sampling data thereof.

The second advantageous effect of the present example embodiment described above is that more flexible sampling can be enabled.

The reason is that the traffic capture unit 102 acquires the transmission sampling data based on the transmission sampling start timing indicated by the sampling phase set D which is a set of sampling phases d.

Modification of First Example Embodiment

Figure 15:
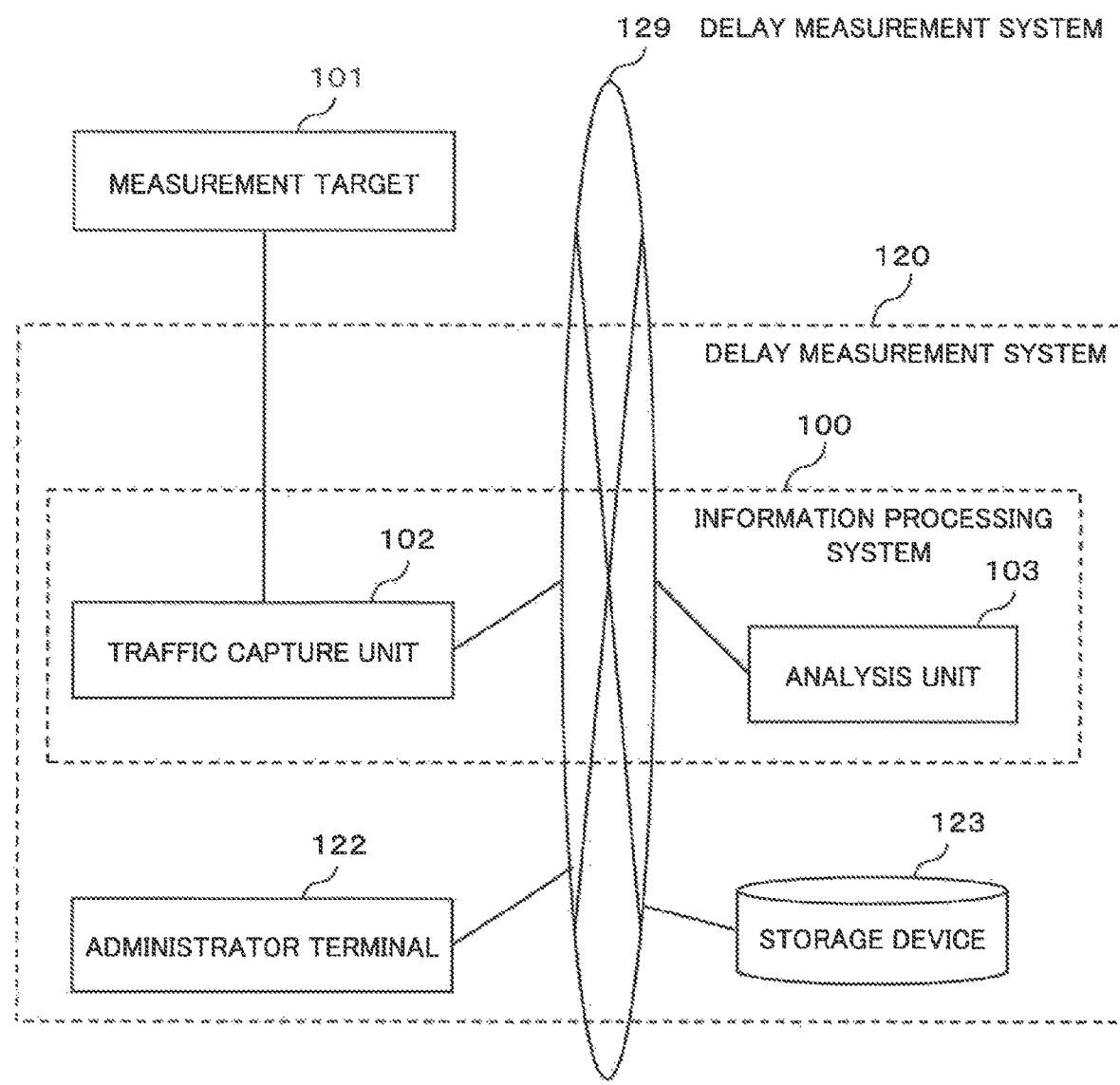
FIG. 15 is a block diagram illustrating a configuration of a delay measurement system which is a modification of the first example embodiment.

FIG. 15 is a block diagram illustrating a configuration of the delay measurement system 120 as a modification of the first embodiment. As illustrated in FIG. 15, the delay measurement system 120 includes the information processing system 100 illustrated in FIG. 1, an administrator terminal 122, and a storage device 123. The traffic capture unit 102 and the analysis unit 103 included in the information processing system 100, the administrator terminal 122, and the storage device 123 are connected via a network 129. Any combination of the traffic capture unit 102, the analysis unit 103, the administrator terminal 122, and the storage device 123 may be one computer 700 as illustrated in FIG. 2. Any one of the traffic capture unit 102, the analysis unit 103, the administrator terminal 122, and the storage device 123 may be directly connected to each other without going through a network. In other words, the traffic capture unit 102, the analysis unit 103, the administrator terminal 122, and the storage device 123 may be freely connected via the network 129.

===Traffic Capture Unit 102===

The traffic capture unit 102 acquires the sampling rule 820 from the storage device 123 via the network 129.

The traffic capture unit 102 acquires the reception sampling data and the transmission sampling data from the reception traffic 811 and the transmission traffic 812 of the measurement target 101, and transmits them to the analysis unit 103 via the network 129.

===Analysis Unit 103===

The analysis unit 103 receives the reception sampling data and the transmission sampling data via the network 129, and records the sampling data 830 in the storage device 123 via the network 129.

The analysis unit 103 calculates the delay time and transmits the analysis result 880 to the administrator terminal 122 via the network 129. The analysis unit 103 may record the analysis result 880 in the storage device 123 via the network 129.

===Storage Device 123===

The storage device 123 stores the sampling rule 820, the sampling data 830, and the analysis result 880.

===Administrator Terminal 122===

The administrator terminal 122 records the sampling rule 820 in the storage device 123 via the network 129.

The administrator terminal 122 receives the analysis result 880 from the analysis unit 103 via the network 129 and displays its content on the display. The administrator terminal 122 may acquire the analysis result 880 stored in the storage device 123 via the network 129 and display its contents on the display.

The advantage of the modification of the present example embodiment described above is that the construction of the delay measurement system 120 can be flexibly realized.

The reason is that the traffic capture unit 102, the analysis unit 103, the administrator terminal 122, and the storage device 123 are freely connected via the network 129.

Second Example Embodiment

Next, a second example embodiment of the present invention will be described in detail with reference to the drawings. Hereinafter, description of contents overlapping with the above description will be omitted as long as the description of the present example embodiment is not obscure.

Figure 16:
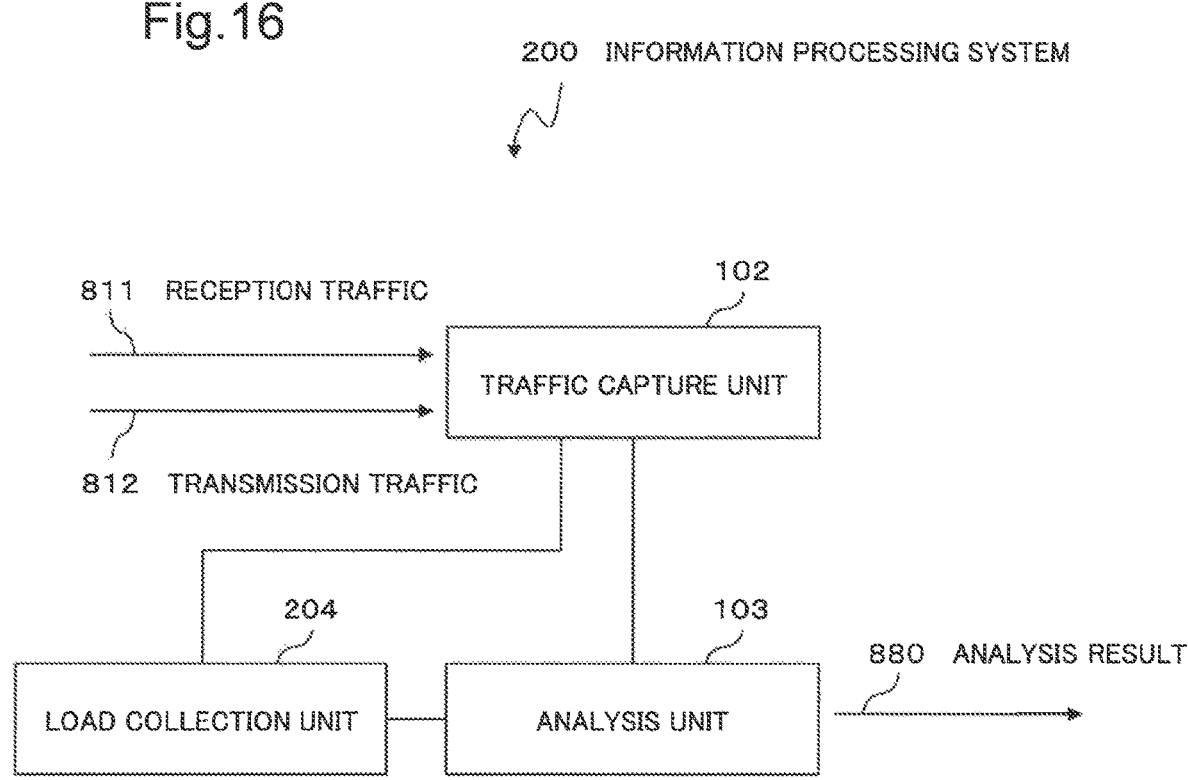
FIG. 16 is a block diagram illustrating a configuration of an information processing system according to a second example embodiment of the present invention.

FIG. 16 is a block diagram illustrating the configuration of the information processing system 200 according to the second example embodiment of the present invention.

As illustrated in FIG. 16, the information processing system 200 in the present example embodiment is different from the information processing system 100 according to the first example embodiment illustrated in FIG. 1 in that it further includes a load collecting unit 204.

===Load Collection Unit 204===

The load collection unit 204 collects load information from the traffic capture unit 102 and the analysis unit 103.

When the state of the collected load exceeds a predetermined threshold, the load collection unit 204 instructs the traffic capture unit 102 to decrease the continuous sampling period t or increase the sampling interval s in such a way as to decrease traffic to be captured. Here, the traffic is the reception traffic 811 and the transmission traffic 812.

When the state of the load is lower than the predetermined threshold, the load collection unit 204 instructs the traffic capture unit 102 to increase the continuous sampling period t or reduce the sampling interval s in such a way as to capture more traffic.

Figure 17:
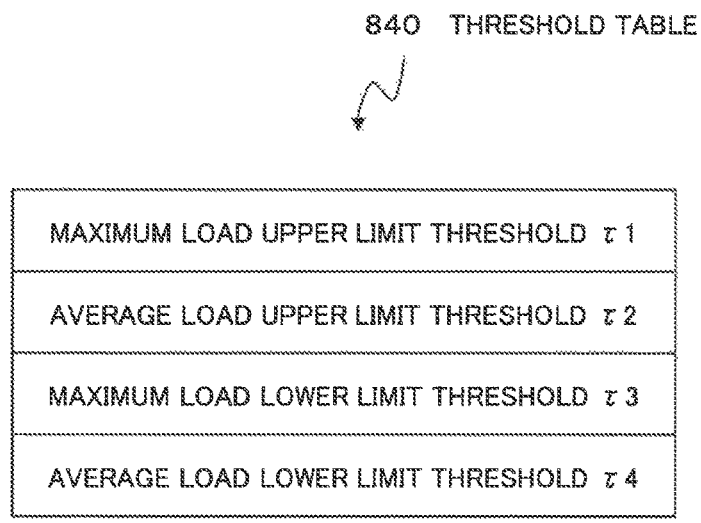
FIG. 17 is a diagram illustrating one example of a structure of a threshold table in the second example embodiment.

FIG. 17 is a diagram illustrating a threshold table in the case of acquiring sampling data. As illustrated in FIG. 17, the threshold table 840 includes a maximum load upper limit threshold $\rho 1$, an average load upper limit threshold $\tau 2$, a maximum load lower limit threshold $\tau 3$, and an average load lower limit threshold $\tau 4$. For example, the threshold table 840 may be stored in the storage unit 702 or the storage device 703 illustrated in FIG. 2 in advance. The load collection unit 204 may acquire the threshold table 840 input by the operator via the input unit 704 illustrated in FIG. 2. The load collection unit 204 may receive the threshold table 840 from a device which is not illustrated through the communication unit 706 illustrated in FIG. 2. The load collection unit 204 may acquire the threshold table 840 recorded on the recording medium 707 via the storage device 703 illustrated in FIG. 2.

The load collection unit 204 uses two of the maximum load and the average load within a predetermined period as indications of the load state. When the maximum load exceeds the predetermined maximum load upper limit threshold $\tau 1$, the load collection unit 204 issues an instruction to the traffic capture unit 102 to decrease the continuous sampling period t by a certain amount. When the average load exceeds the predetermined average load upper limit threshold $\tau 2$, the load collection unit 204 issues an instruction to the traffic capture unit 102 to increase the sampling interval s by a certain amount.

When the maximum load is lower than the predetermined maximum load lower limit threshold $\tau 3$, the load collecting unit 204 instructs the traffic capture unit 102 to increase the continuous sampling period t by a fixed amount. Then, when the average load is lower than the predetermined average load lower limit threshold $\tau 4$, the load collection unit 204 instructs the traffic capture unit 102 to decrease the sampling interval s by a fixed amount.

The reason for doing as described above is that when the continuous sampling period t is long, a load is generated in a burst manner, so that the maximum load becomes high, and when the sampling interval s is small, a large number of sampling is performed within a fixed period, which increases the average load.

Like the information processing system 100, the information processing system 200 may be achieved by the computer 700 illustrated in FIG. 2.

In this case, the CPU 701 executes various processes according to the program read, and based on the read data, also as the load collection unit 204 illustrated in FIG. 16.

The storage unit 702 may further store the threshold table 840. The storage unit 702 may also be included as a part of the load collection unit 204.

The storage device 703 may further store the threshold table 840. The storage device 703 may also be included as a part of the load collection unit 204.

The input unit 704 may also be included as a part of the load collection unit 204.

The output unit 705 may also be included as a part of the load collection unit 204.

The communication unit 706 may also be included as a part of the load collection unit 204.

An advantageous effect of the present example embodiment described above is, in addition to the advantageous effect of the first example embodiment, that it is possible to enable efficient delay measurement while preventing the traffic capture unit 102 and the analysis unit 103 from overloading and failing in delay measurement.

The reason is that the load collection unit 204 instructs the traffic capture unit 102 to change the continuous sampling period t or the sampling interval s according to the load state of the traffic capture unit 102 and the analysis unit 103.

Third Example Embodiment

Next, a third example embodiment of the present invention will be described in detail with reference to the drawings. Hereinafter, description of contents overlapping with the above description will be omitted as long as the description of the present example embodiment is not obscure.

Figure 18:
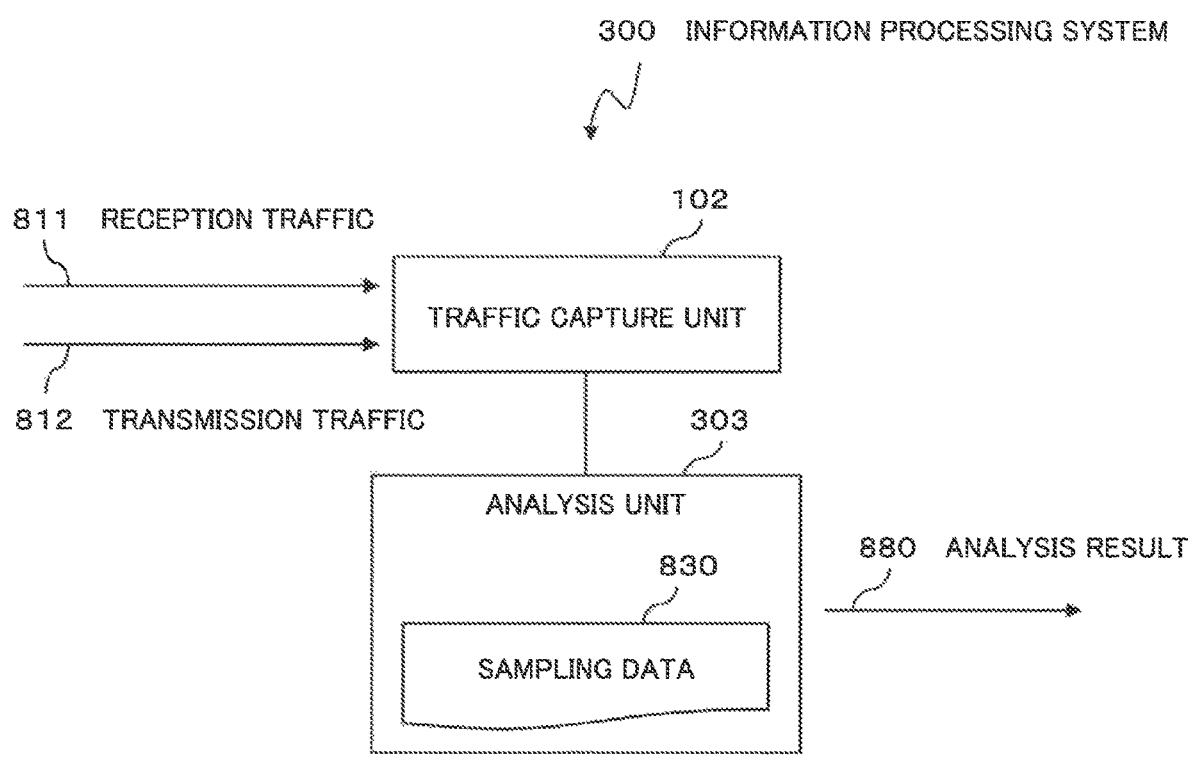
FIG. 18 is a block diagram illustrating a configuration of an information processing system according to a third example embodiment of the present invention.

FIG. 18 is a block diagram illustrating the configuration of the information processing system 300 according to the third example embodiment of the present invention.

As illustrated in FIG. 18, the information processing system 300 according to the present example embodiment is different from the information processing system 100 of the first example embodiment in that it includes an analysis unit 303 instead of the analysis unit 103.

The analysis unit 303 differs from the analysis unit 103 in that a sampling phase set D of the sampling rule 820 is updated based on the analysis result of the reception sampling data and the transmission sampling data.

For example, the analysis unit 303 updates the sampling phase set D in such a way as to perform measurement with respect to a delay time for which sufficient measurement has not been made. The analysis unit 303 analyzes the reception sampling data and the transmission sampling data, and detects a delay time with respect to the delay time in the traffic of the measurement target 101, the delay evaluation value being equal to or less than a predetermined value. Next, the analysis unit 303 updates the sampling phase set D in such a way as to intensively evaluate a packet (traffic) corresponding to the detected delay time. In this case, the analysis unit 303 updates the sampling phase set D in such a way that at least one element of the sampling phase set D has its delay time when a delay time with a delay evaluation value equal to or less than a predetermined value is detected.

In another example, the analysis unit 303 may update the sampling phase set D in such a way as to increase the measurement efficiency as much as possible and reduce the total amount of packets that can not be measured. For example, it is assumed that the sampling phase set D={10, 10, 20, 30} is set based on a delay evaluation value that there are many packets with delay time of about 10 ms determined in advance by some method. In this case, it is assumed that a delay evaluation value that there are many packets with delay time of about 20 ms is obtained with a delay evaluation value obtained based on the actually measured result. In this case, the analysis unit 303 updates the sampling phase set D={10, 20, 20, 30}.

As one example of an operation in this case, the analysis unit 303 obtains a value obtained by dividing a delay evaluation value actually measured for the delay time by a predetermined delay evaluation value for several delay times. Then, the analysis unit 303 updates the sampling phase set D based on the ratio of the values obtained for each delay time. The ratio of the value obtained by dividing the delay evaluation value obtained by actual measurement by the predetermined delay evaluation value corresponds to the ratio related to a delay time of actually flowing traffic.

When the sampling phase set D is updated, the above-described predetermined value may be stored in the storage unit 702 or the storage device 703 illustrated in FIG. 2 in advance. The analysis unit 303 may acquire the predetermined value input by an operator via the input unit 704 illustrated in FIG. 2. The analysis unit 303 may receive the predetermined value from a device which is not illustrated through the communication unit 706 illustrated in FIG. 2. The analysis unit 303 may acquire the predetermined value recorded in the recording medium 707 via the storage device 703 illustrated in FIG. 2.

The advantageous effect of the present example embodiment described above is that it is possible to measure a delay time for a traffic pattern with higher necessity without requiring a skilled administrator or the like in addition to the advantageous effect of the first example embodiment. The second advantageous effect in the present example embodiment described above is that it is possible to more flexibly deal with traffic of the measurement target 101 and to measure the delay time without requiring a skilled administrator or the like.

The reason is that the analysis unit 303 updates the sampling phase set D of the sampling rule 820 based on the analysis result of the reception sampling data and the transmission sampling data.

The respective components described in the above example embodiments need not necessarily be independent entities. For example, a plurality of any components thereof may be achieved as one module. Any one of the components may be achieved by a plurality of modules. Any one of the components may be any another of the components. A part of any one of the components may overlap with a part of any another of the components.

The modules implementing the respective components and the respective components in the above-described embodiments may be achieved by hardware as needed, if possible. Each component and a module for implementing each component may be achieved by a computer and a program. Each component and a module for implementing each component may be achieved by mixing a hardware module, a computer, and a program.

The program is recorded on a computer readable non-transitory recording medium such as a magnetic disk or a semiconductor memory, and is provided to a computer. Then, the program is read by the computer from a non-transitory recording medium at the start-up of the computer or the like. By controlling an operation of the computer, the read program causes the computer to function as the components in each of the example embodiments described above.

In each of the above-described example embodiments, a plurality of operations are described in order of a flow chart format, but the order of description does not limit the order of executing a plurality of operations. Therefore, when performing each of the embodiments, the order of the plurality of operation can be changed in a range without interfering the contents.

Furthermore, in each of the above-described embodiments, the plurality of operations are not limited to being executed at different timing individually. For example, other operations may occur while performing a certain operation. The execution timing of a certain operation and that of another operation may be partially or entirely overlapped.

Further, in each of the above-described example embodiments, a certain operation is described as a trigger for another operation, but the description does not limit the relation between a certain operation and another operation. Therefore, when implementing each embodiment, the relation between the plurality of operations can be changed within a range to which the content is not changed. Specific description of each operation of each component does not limit each operation of each component. Therefore, each specific operation of each component may be changed within a range not obstructing functional, performance, and other characteristics in implementing each example embodiment.

Although the present invention has been described with reference to the respective example embodiments, the present invention is not limited to the above-described example embodiments. Various changes that can be understood by those skilled in the art within the scope of the present invention can be made to the configuration and details of the present invention.

INDUSTRIAL APPLICABILITY

The present invention can be applied to a base for managing the performance of a system or a network in a company, a data center or the like.

This application claims priority based on Japanese Patent Application No. 2014-228062 filed on Nov. 10, 2014, the disclosure of which is incorporated herein in its entirety.

REFERENCE SIGNS LIST 100 information processing system
101 measurement target
102 traffic capture unit
103 analysis unit
303 analysis unit
110 delay measurement system
120 delay measurement system
122 administrator terminal
123 storage device
129 network
200 information processing system
204 load collection unit
300 information processing system
700 computer
701 CPU
702 storage unit
703 storage device
704 input unit
705 output unit 706 communication unit
707 recording medium
811 reception traffic
812 transmission traffic
820 sampling rule
830 sampling data
840 threshold table
880 analysis result

The invention claimed is:

1. An information processing system, comprising:
a memory storing program instructions; and
a processor configured to execute the program instructions to:
acquire reception sampling data based on a sampling interval and a continuous sampling period, the sampling interval indicating a predetermined interval of reception sampling start timing representing timing to start sampling at the predetermined period for acquiring reception sampling data by capturing reception traffic of a measurement target and the continuous sampling period indicating a period for continuing the sampling, and acquire transmission sampling data based on transmission sampling start timing and the continuous sampling period, the transmission sampling start timing indicating timing to start transmission on sampling for acquiring transmission sampling data by capturing transmission traffic of the measurement target different from the reception sampling start timing; and
calculate a delay time of the measurement target based on the reception sampling data and the transmission sampling data.

2. The information processing system according to claim 1, wherein the processor is further configured to execute the program instructions to:
determine the transmission sampling start timing based on a sampling phase indicating a shift of the transmission sampling start timing with respect to the reception sampling start timing.

3. The information processing system according to claim 2, wherein
the sampling phase indicates a plurality of the shift, and
wherein the processor is further configured to execute the program instructions to sequentially and repeatedly select one of the sampling phases from the plurality of sampling phases, and determine the transmission sampling start timing based on the selected sampling phase.

4. The information processing system according to claim 2, wherein the processor is further configured to execute the program instructions to:
update the sampling phase based on a result of analyzing the reception sampling data and the transmission sampling data.

5. The information processing system according to claim 1, wherein the processor is further configured to execute the program instructions to:
hold sampling data including a pair of a set of the reception sampling data and a set of the transmission sampling data equal to or less than a predetermined value, and calculate a delay time of the measurement target based on the sampling set held therein.

6. The information processing system according to claim 1, wherein the processor is further configured to execute the program instructions to:
collect load information and determine at least any of the reception sampling start timing and the continuous sampling period based on the load information.

7. The information processing system according to claim 6, wherein
the load information includes any of a maximum load and an average load within a fixed period, and
wherein the processor is further configured to execute the program instructions to decrease the continuous sampling period when the maximum load exceeds a maximum load upper threshold, increase the sampling interval when the average load exceeds an average load upper limit threshold, increase the continuous sampling period when the maximum load is equal to or less than a maximum load lower limit threshold, and decrease the sampling interval when the average load is equal to or less than an average load lower limit threshold.

8. The information processing system according to claim 6, wherein the processor is further configured to execute the program instructions to:
receive at least any one of a maximum load upper limit threshold, an average load upper limit threshold, a maximum load lower limit threshold, and an average load lower limit threshold.

9. A delay measurement method, comprising:
acquiring reception sampling data based on a sampling interval and a continuous sampling period, the sampling interval indicating a predetermined interval of reception sampling start timing representing timing to start sampling at the predetermined period for acquiring reception sampling data by capturing reception traffic of a measurement target and the continuous sampling period indicating a period for continuing the sampling;
acquiring transmission sampling data based on transmission sampling start timing, and the continuous sampling period, the sampling start timing indicating timing to start transmission sampling for acquiring transmission sampling data by capturing transmission traffic of the measurement target different from the reception sampling start timing; and
calculating a delay time of the measurement target based on the reception sampling data and the transmission sampling data.

10. A computer readable non-transitory recording medium storing a program for causing a computer to execute:
a process of acquiring reception sampling data based on a sampling interval and a continuous sampling period, the sampling interval indicating a predetermined interval of reception sampling start timing representing timing to start sampling at the predetermined period for acquiring reception sampling data by capturing reception traffic of a measurement target and the continuous sampling period indicating a period for continuing the sampling;
a process of acquiring transmission sampling data based on transmission sampling start timing and the continuous sampling period, the transmission sampling start timing indicating timing to start transmission sampling for acquiring transmission sampling data by capturing transmission traffic of the measurement target different from the reception sampling start timing; and
a process of calculating a delay time of the measurement target based on the reception sampling data and the transmission sampling data.

* * * * *

UNITED STATES PATENT AND TRADEMARK OFFICE
CERTIFICATE OF CORRECTION

PATENT NO. : 10,554,509 B2
APPLICATION NO. : 15/525083
DATED : February 4, 2020
INVENTOR(S) : Masaya Fujiwaka It is certified that error appears in the above-identified patent and that said Letters Patent is hereby corrected as shown below:

In the Specification

Column 13, Description of Embodiments, Line 30; Delete "ρ1," and insert --τ1,-- therefor Signed and Sealed this
Fifth Day of May, 2020

Andrei Iancu
*Director of the United States Patent and Trademark Office*